(No Model.)
W. S. GORDON.
COAL MINING MACHINE.
No. 345,500. Patented July 13, 1886.
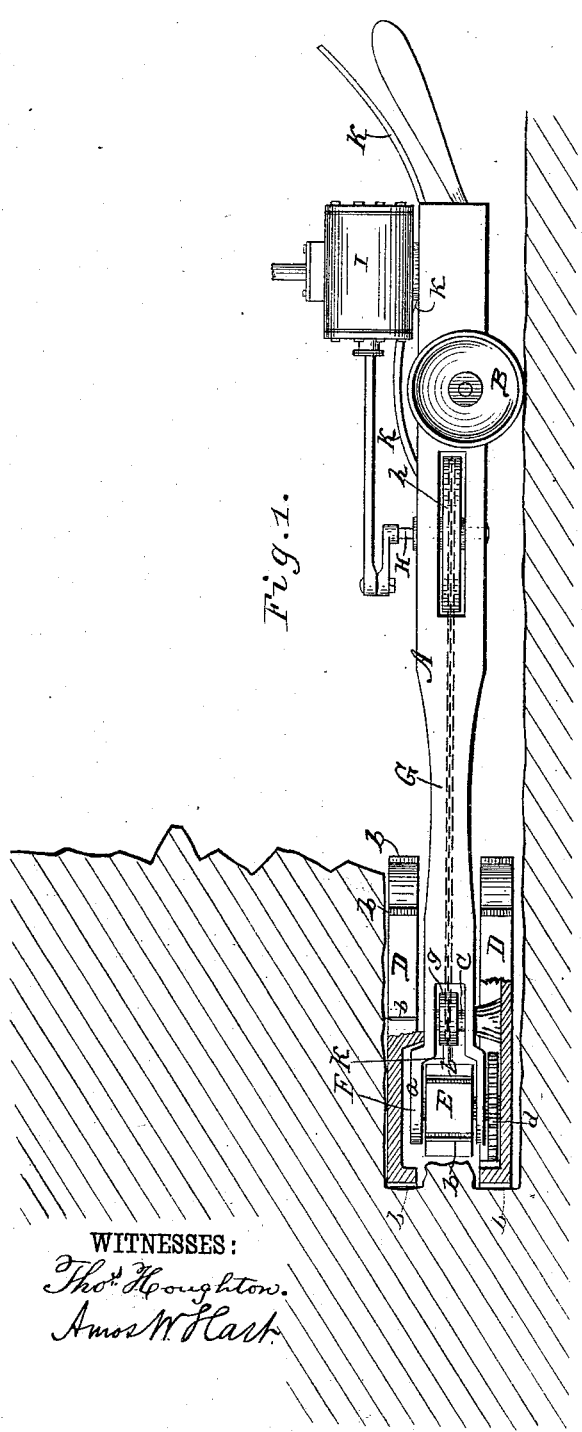
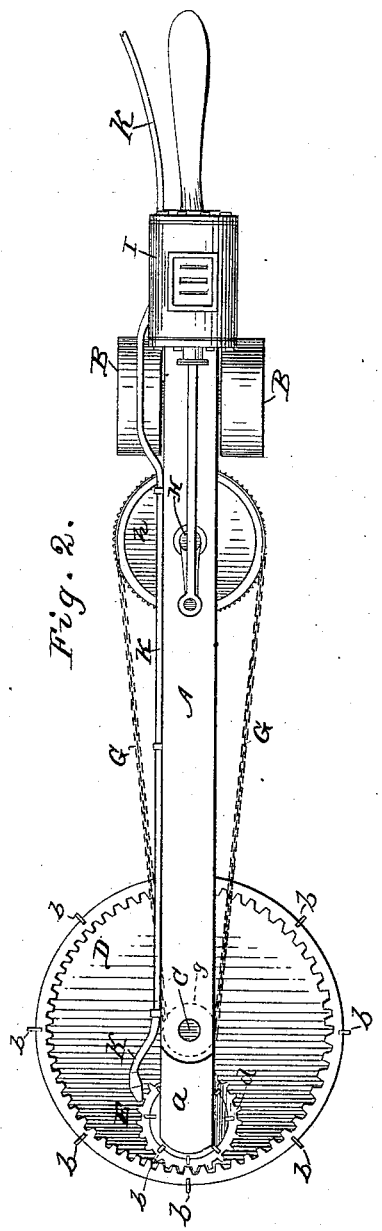
WITNESSES:
Thos. Houghton.
Amos W. Hart.
INVENTOR:
W. S. Gordon
BY Munn & Co
ATTORNEYS.

UNITED STATES PATENT OFFICE.

WALTER S. GORDON, OF ATLANTA, GEORGIA.

COAL-MINING MACHINE.

SPECIFICATION forming part of Letters Patent No. 345,500, dated July 13, 1886.

Application filed March 12, 1886. Serial No. 195,016. (No model.)

*To all whom it may concern:*

Be it known that I, WALTER S. GORDON, of Atlanta, in the county of Fulton and State of Georgia, have invented a new and useful Improvement in Coal-Mining Machines, of which the following is a specification.

My invention relates to a coal-mining machine operated by power, and which may be impelled against a solid wall of coal in the mine, into which it will cut by a continuing movement, the coal being excavated and under cut so that the miner can break it down.

The essential features of my invention comprise a pair of revolving toothed cutters or saws mounted on a common shaft and running in parallel planes, and a smaller intermediate rotary cutter working in the same plane and between the two larger cutters, and also in front of the shaft on which they are mounted. The said intermediate cutter cuts and removes the coal between the direct cuts made by the larger ones. All these cutters are geared so that they may be run by power transmitted to them in the manner hereinafter described.

In the accompanying drawings, Figure 1 is a side elevation of my machine. Fig. 2 is a plan view with one of the main cutters removed.

A represents the frame of the machine, preferably composed of a bar forked at its front end, $a$. The rear end of the frame is mounted upon a carriage or truck, B, so that the end carrying the cutters may be elevated or depressed, according to the angle at which the tools are to enter the wall, and to enable the machine to be moved from place to place.

Journaled in the fork of bar A is a transverse shaft, C, upon whose ends are keyed or otherwise firmly secured the cutters or saws D D, having sharp radial teeth $b$, which are preferably hardened to withstand the severe and constant wear to which they are subjected when in operation.

In place of metal teeth the cutters may be set with diamonds.

The cutters project a short distance in front of the frame or bar $a$, in order that they may penetrate some distance into the wall of coal, and thus define the area to be excavated before the intermediate cutter, E, commences to cut. This cutter is mounted between the main saws or cutters D upon a shaft, F, journaled in the fork $a$, and on same plane as the shaft C. The cutters D are recessed on the inner side, to allow space to receive the adjacent projecting portions of the fork $a$ and the gearing. The cutter E enters the mass of coal between the main or larger saws, D, and by a cutting and tearing action loosens and detaches the coal in fragments within that space. The shaft F carries a cog-wheel, $d$, which meshes with the gear-teeth formed internally on the rim of the cutters D, for the purpose of transmitting power to the cutter E.

Power is transmitted to the driven shaft C and its cutters by a belt or cable, G, which runs on a pulley, $g$, fixed between the forks $a$ on the shaft C and a large pulley, $h$, mounted fast on a shaft, H, journaled in the bar A in front of the truck B. This larger pulley $h$ is driven by a crank-and-pitman connection with an oscillating piston and cylinder, I, the latter being pivoted on bar A in rear of the truck B. Steam or compressed air is admitted to the cylinder I by means of a flexible pipe extending along the main tunnel or shaft. Compressed air may also be forced through a tube, K, and thrown upon the cutters to free them from coal-dust and prevent clogging.

The bearings of the cutter-shafts will be suitably constructed to prevent admission of dust, &c. The larger cutters D will ordinarily be worked in horizontal position to enable them to undercut the face of a wall so that the miner may then break down the coal above the cut thus made; but the cutters may obviously be worked in vertical position when required.

What I claim is—

1. In a machine for mining coal, the combination, with a supporting-frame and suitable driving mechanism, of a rotary cutter, D, having an internally-toothed rim and recessed internally between said rim and the hub, with the bar A, and a gear-wheel journaled on the side of the latter and engaging said rim for the purpose of driving the cutter, as shown and described.

2. In a machine for mining coal, the combination, with an adjustable main frame and suitable driving mechanism, of a pair of revolving saws running in parallel planes, an intermediate smaller rotary cutter on same plane, a driving-shaft, and gearing connecting the several shafts, substantially as described.

3. In a machine for mining coal, the combination, with the driving-shaft having the sprocket-wheel G, of the shaft C, carrying revolving saws, the wheel $g$, the internally-geared cutter D, and shaft F, having a gear-wheel, $d$, and carrying a rotary cutter, E, substantially as described and shown.

WALTER S. GORDON.

Witnesses:
C. H. GIRARDEAU,
HARRY KROUSE.